March 22, 1966 C. W. KUHN ET AL 3,241,381

MOTION TRANSMITTING MECHANISM

Original Filed Feb. 28, 1962 5 Sheets-Sheet 1

MOTION TRANSMITTING MECHANISM

Original Filed Feb. 28, 1962 5 Sheets-Sheet 2

March 22, 1966 C. W. KUHN ET AL 3,241,381

MOTION TRANSMITTING MECHANISM

Original Filed Feb. 28, 1962 5 Sheets-Sheet 4

Inventors
Clarence W. Kuhn
Charles Roy Smith
By H R Rather
Attorney

MOTION TRANSMITTING MECHANISM

Original Filed Feb. 28, 1962

Inventors
Clarence W. Kuhn
Charles Roy Smith
By H R Ratter
Attorney

United States Patent Office 3,241,381
Patented Mar. 22, 1966

3,241,381
MOTION TRANSMITTING MECHANISM

Clarence W. Kuhn, Wauwatosa, and Charles R. Smith, Milwaukee, Wis., assignors to Cutler-Hammer, Inc., Milwaukee, Wis., a corporation of Delaware Original application Feb. 28, 1962, Ser. No. 176,354, now Patent No. 3,135,849, dated June 2, 1964. Divided and this application Nov. 14, 1963, Ser. No. 323,700
2 Claims. (Cl. 74—97)

This application is a division of our application Serial No. 176,354, filed February 28, 1962, now Patent No. 3,135,849, issued June 2, 1964.

This invention relates to improved thermostatic control switches for refrigerators and the like.

This invention relates to an improved motion transmitting mechanism.

A primary object of the present invention is to provide a novel and improved form of motion transmitting and amplifying mechanism which affords drive of a switch mechanism from one to the other of its stable operating conditions and vice versa, in response to inward and outward movements of the power element diaphragm without subjecting the latter to any appreciable loading.

Another object is to provide a motion transmitting and amplifying mechanism which is characterized by having separate levers for driving the operating member of the snap acting switch mechanism in opposite directions with lost motion thereby rendering the switch mechanism unaffected by range or differential adjustments, and A more specific object is to provide a novel form of stabilizing member for holding the separate levers in alinement for permitting them individual movement and pivoting.

Other objects and advantages of the invention will hereinafter appear.

The accompanying drawings illustrate preferred embodiments which will now be described in detail, it being understood that the embodiments illustrated are susceptible of various modifications without departing from the scope of the appended claims.

Referring particularly to FIGS. 1 to 13, they disclose a preferred and basic form of refrigerator control embodying the invention which comprises a thermal responsive power element 30, an operating mechanism enclosing case 32, and a range adjusting knob 34. This form is a so-called "straight range" version wherein "cut-in" and "cut-out" points are simultaneously adjustable while maintaining the differential between such points substantially constant.

Power element 30 is provided with a cup-shaped portion 30*a*, a pair of side frame portions 30*b* which integrally join with portion 30*a* on opposite sides at the upper end of the latter. At corresponding ends portions 30*b* are provided with integral tabs 30*c* (see FIG. 5) which extend through slots in a mounting bracket 36 and are upset over the opposite side of bracket 36 to secure the latter in place.

Figure 1:
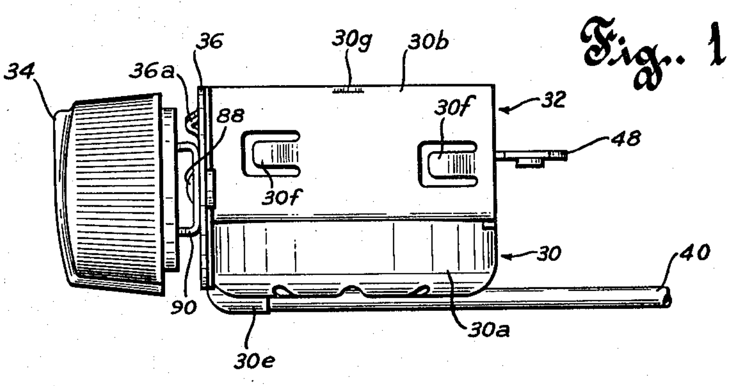
FIGURE 1 is a side elevation view of a thermostatic control switch constructed in accordance with the invention.
Figure 2:
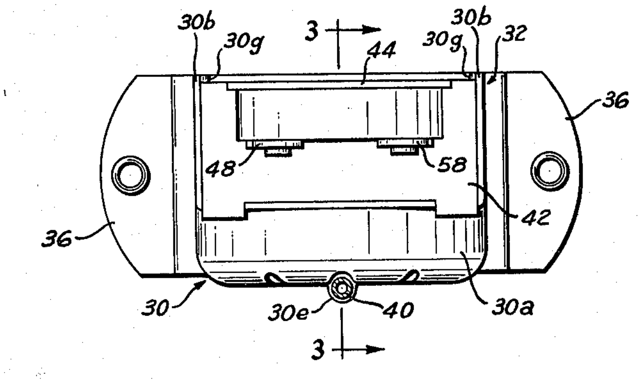
FIG. 2 is a right end view of the control switch shown in FIG. 1.
Figure 3:
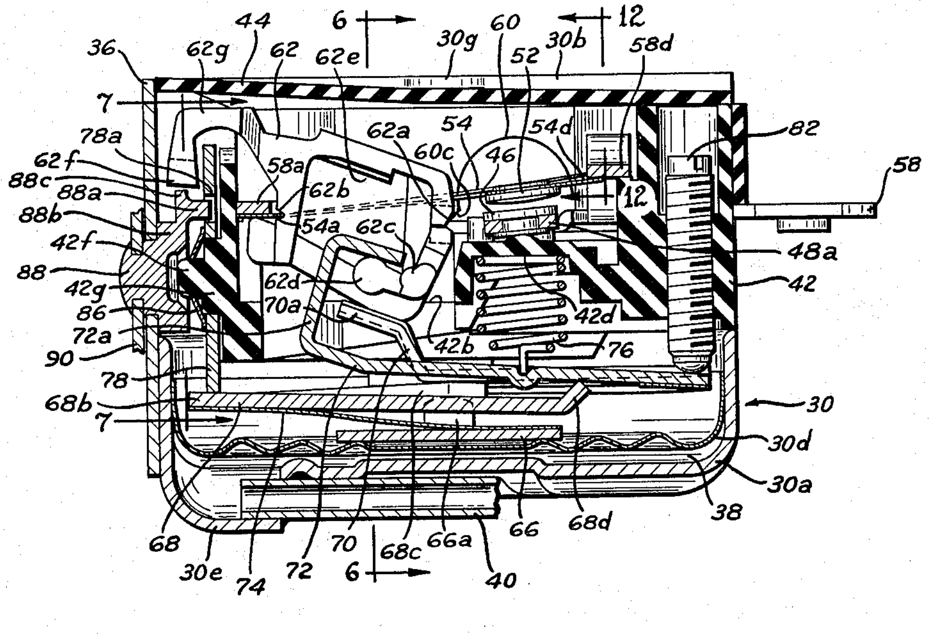
FIG. 3 is a view in cross section taken along the line 3—3 of FIG. 2.
Figures 4, 5:
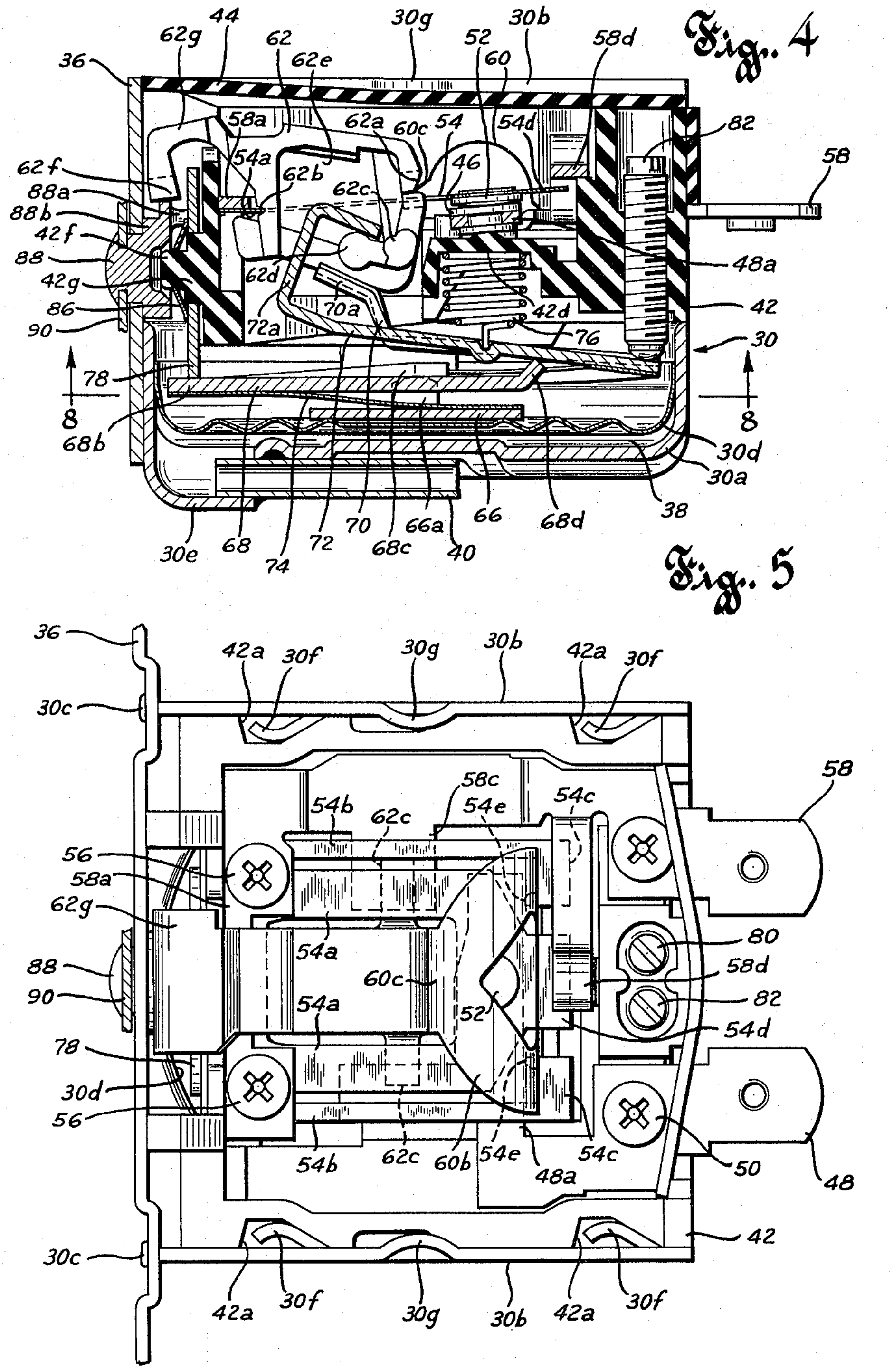
FIG. 4 is a view like FIG. 3 but showing the control switch in another operating condition.
FIG. 5 is a top plan view with a cover removed to show interior mechanism.
Figure 6:
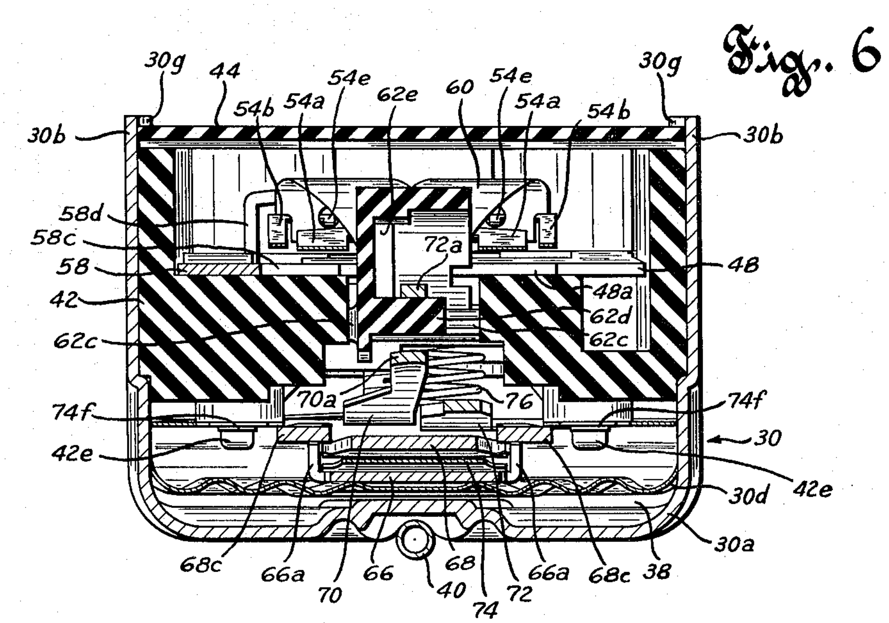
FIG. 6 is a view in cross section taken along the line 6—6 of FIG. 3.

As best shown in FIGS. 3 and 4, power element 30 is provided with a diaphragm 30*d* which is suitably secured in a sealed relation to the inner wall of the cup portion 30*a* to form an enclosed diaphragm chamber 38 therewith. A capillary tube 40 penetrates and is sealed to a boss portion 30*e* which extends downward at one side of the underside of portion 30*a*. Tube 40, as is well known, is of some definite length and its bore and diaphragm chamber 38 of element 30 are provided with a suitable fill gas such as Freon (F–22 or F–12) or methyl chloride. Diaphragm 30*d* is preferably formed in accordance with the teaching of the Smith Patent No. 2,751,935 so that it will move outwardly and inwardly in a linear relation to changes in pressure of the gas in the chamber 38 and tube 40.

A base 42 formed of a suitable molded electric insulating material seats at its lower end against the upper edge of cup-portion 30*a* on opposite sides between the side from portion 30*a* and at one end against bracket 36. Tabs 30*f* struck out of the portions 30*b* are bent into recesses 42*a* (see FIGS. 1 and 5) formed in the outer surfaces of the aforementioned sides of base 42 and serve to secure the latter and power element 30 in assembled relation.

A cover 44 formed of a suitable insulating material seats against the upper surface of base 42 and is secured in place by inwardly extending tabs 30*g* formed along the upper edges of the portions 30*b*.

A stationary contact 46 is mounted on an arm 48*a* of stationary contact terminal member 48 (see FIGS. 5 and 11) that seats within base 42 where it is secured by a screw 50. A movable contact 52 is secured in overlying working relation to contact 46 to the free end of a central hollow rectangular portion 54*a* of a metallic reed member 54 which is of a form best shown in FIG. 13. At its other end member 54 is provided with spaced apart openings to accommodate screws 56 which also penetrate the arm 58*a* of a terminal member 58 that overlies and contacts the last mentioned end of member 54 to secure the latter and terminal member 58 in place in base 42.

Figures 11, 13:
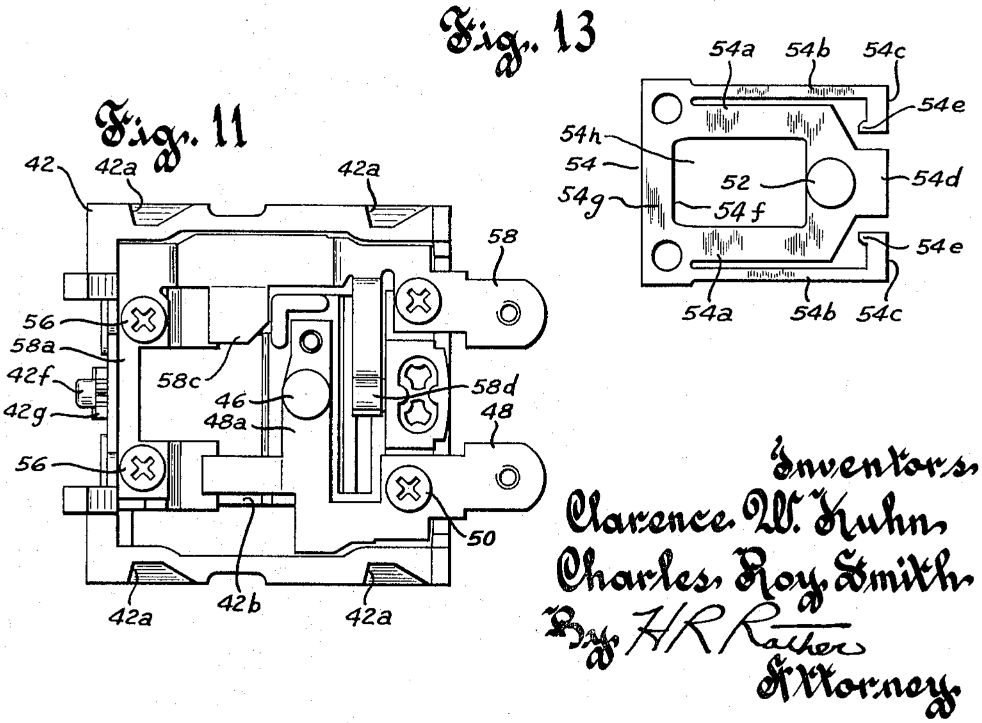
FIG. 11 is a view like FIG. 5 but to smaller scale and with certain mechanism removed.
FIG. 13 is a top plan view of a part in the switch mechanism.

As shown in FIG. 13, member 54 is provided with legs 54*b* which are spaced apart and extend parallel with the longitudinal sides of the portion 54*a*. At their outer ends the portions 54*b* have integral portions 54*c* that extend inwardly toward a tab 54*d* integrally formed on the free end of portion 54*a*. Portions 54*c* have hooked lips 54*e* that extend generally parallel with the portions 54*b*.

Reed member 54 is formed to accurate dimensions by suitably blanking the same from thin flat stock of a spring temper material, such as beryllium copper alloy. Mounting recesses for member 54 and terminal member 58 are so formed that when the same are initially secured in base 42 by screws 56 contact 52 will be forced into engagement with contact 46 with some pre-bending of the portion 54a thereby establishing a minimum normal engagement pressure between contacts 52 and 46.

A C-shaped flipper spring 60 has a slot 60a formed therein (see FIGS. 3, 4, 5, 12, 14 and 15 and the tab 54d of member 54 extends therethrough. The portions 54c and 43e of each of the legs 54b also extend or hook over the web 60b of spring 60 with the portions 54e extending into the slot 60a. The web 60b narrows and terminates at an end 60c that engages in a V-shaped notch 62a formed in one end of a molded drive lever 62. Flipper spring 60 is formed by blanking from thin flat stock of stainless steel which has been suitably heat treated and tempered. The C-shape configuration of spring 60 is imparted in assembling it to the reed member 54 and drive lever 62, but preformed C-shaped springs can also be used.

Drive lever 62 at its opposite end is provided with a V-shaped notch 62b that engages on the inner edge 54f of the end portion 54g bounding one end of the central opening 54h of member 54 to provide a pivot fulcrum point for lever 62. As viewed in FIG. 3, notch 62a is below the plane of member 54 and the forces developed in spring 60 hold the tab 54d in engagement with a lateral stop finger 58d integrally formed with terminal member 58. In such position of member 54 contact 52 is held out of engagement from contact 46 thereby interrupting circuit.

Figures 10, 14, 15:
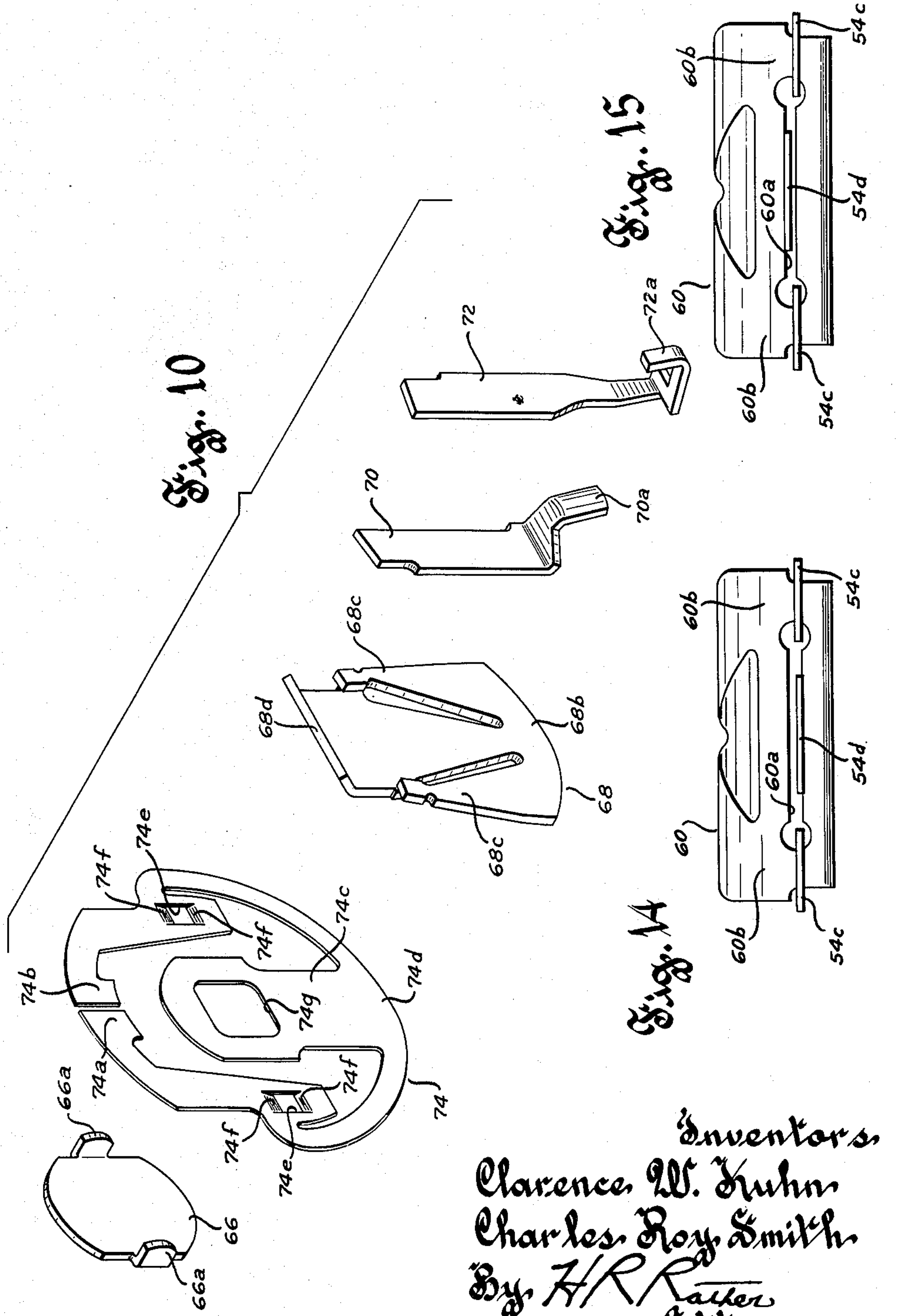
FIG. 10 is a view showing the parts of the lever assembly in FIG. 9 in exploded relation.
FIG. 14 shows one operating condition of certain parts used in the switch mechanism of the control switch.
FIG. 15 is like FIG. 14 but shows the same parts in another operating condition.

If drive lever 62 is pivoted counterclockwise about its pivot fulcrum at notch 62b and end 60c of spring 60 will move upwardly and be compressed, and the upward component of force exerted by spring 60 on the member 54 decreases as the angle between its ends and the plane of member 54 decreases. A null point is reached where the upward force exerted by spring 60 is equal to the downward force exerted by member 54 due to its aforementioned bending. Any further counterclockwise movement of lever 62 permits tab 54d, and hence portion 54a, to move downwardly to engage contact 52 with contact 46. Before the end 60c moves across the plane of the legs 54b, the force exerted by spring 60 reverses to exert a vertical downward component, and a toggle action takes place causing spring 60 to move rapidly with lost motion the width of its slot 60a, minus the thickness of member 54, to engage along the upper margin of its slot as depicted in FIG. 15 and drive tab 54d downwardly and close contact 52 upon contact 46. In the closed position of the contacts, shown in FIGS. 4 and 15, the force developed in spring 60 applied through the upper side of slot 60a against tab 54d is added to the aforementioned prebending stress in member 54 to hold contact 52 against contact 46. Overtravel of lever 62 in the clockwise direction is limited by engagement of one of the projections 62c with a tab 58c which overlies such projection.

Assuming that contact 52 is closed against contact 46 as shown in FIG. 4, if drive lever 62 is pivoted clockwise about its notch 62b the end 60c of spring 60 will move downwardly along an arc and be compressed. This increases the force developed in spring 60, but because of its changing angle relative to the plane of reed member 54 the downward vertical component of force exerted on tab 54d is decreased which reduces the contact engagement pressure. When notch 62a is in line with legs 54b the vertical component of force exerted by spring 60 on member 54 becomes zero. As lever 62 continues to pivot clockwise, the vertical component of force exerted by spring 60 reverses and a position is reached where the upward force exerted by spring 62 on member 54 is balanced by the downward forces exerted by legs 54b and a balance of forces exists. Only the aforementioned prebending stress of member 54 provides contact engagement pressure. Any additional clockwise movement of lever 62 increases the vertical component exerted by spring 60 and legs 54a will move the distance of slot 60a (less the thickness of member 54) and spring 60 will toggle member 54 rapidly upwardly to move contact 52 from engagement with contact 46. Member 54 is limited in upward travel by engagement of the upper surface of its tab 54d with stop finger 58d which is an integral part of member 58. Similarly, the integral projections 62c on drive lever 62 engage the lower surfaces of recesses 42b, formed in base 42 to limit overtravel movement of the lever in the clockwise direction.

Between drive lever 62 and diaphragm 30d a lever motion multiplying and range differential adjusted system is interposed. Referring particularly to FIGS. 3, 4, 8, 9 and 10, the motion multiplying system includes a thrust plate 66, a range lever 68, a "cut-in" lever 70, a "cut-out" lever 72, a stabilizing leaf member 74 and a biasing spring 76. Thrust plate 66 bears centrally against the diaphragm 30d, and diametrically opposite legs 66a bear at their arcuate upper ends against the outer arms 68c of range lever 68. Lever 68 bears at its one end 68b against the edge of a range adjusting cam 78. At the tip of its opposite angularly upward end 68d, lever 68 bears against the lower sides of the levers 70 and 72. Lever 70 pivots against the lower end of an adjusting screw 80, and lever 72 bears at its corresponding end against the lower end of an adjusting screw 82.

Bias spring 76 seats at its upper end in a recess 42d formed in base 42, and terminates at its other end in a coaxial straight end that bears in a recess in the upper surface of "cut-out" lever 72. The spring 76 develops a counterclockwise torque on lever 72 about its pivot on the end of screw 82.

Figure 9:
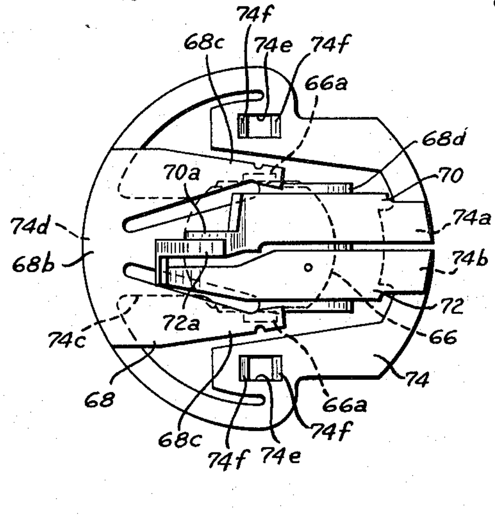
FIG. 9 is a top plan view of a lever assembly used in the control switch.
Figure 12:
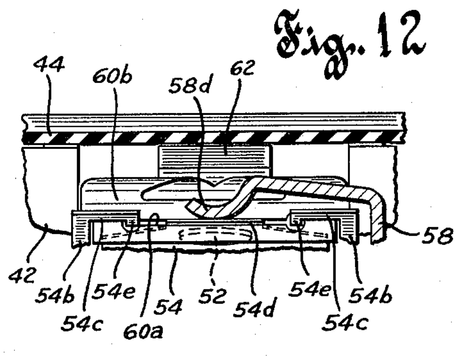
FIG. 12 is a fragmentary view taken along the line 12—12 of FIG. 3.
Figure 8:
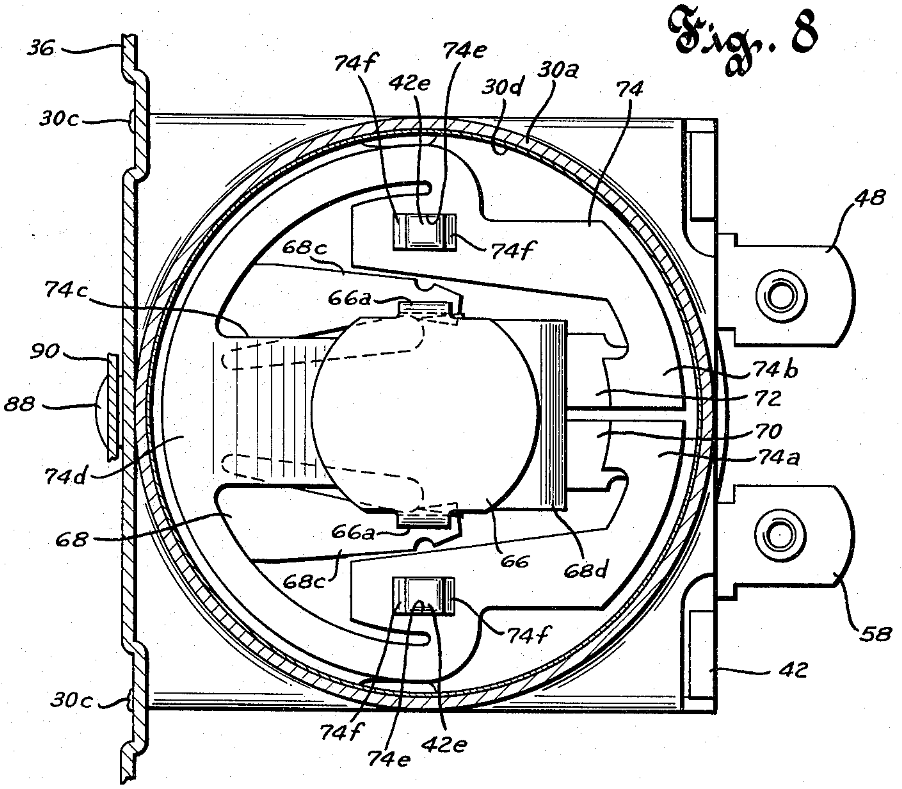
FIG. 8 is a view in cross section taken along the line 8—8 of FIG. 4.

As best seen in FIGS. 8, 9 and 10, plates 66 and levers 68, 70 and 72 are held together in assembled relation by leaf member 74 which is preferably formed of thin flexible spring stock. Levers 70 and 72 are spot welded to the ends of the outer legs 74a and 74b, respectively, and the plate 66 is spot welded on its upper surface to the end of the central leg 74c of member 74 with the legs 66a of plate 66 straddling the outer margin of leg 74c. Range lever 68 is spot welded at its end 68b to the intermediate connecting bight 74d of member 74. This assembly is secured and located in base 42 by means of spaced downwardly projecting lugs 42e formed on the base molding which penetrate openings 74e formed in leaf member 74. Oppositely disposed tabs 74f formed in the margin of the latter openings grip the sides of lugs 42e and dig in to prevent withdrawal therefrom. Stabilizing member 74 provides lateral stabilizing for plate 66 and levers 68, 70 and 72 and flexes to permit such plate and levers to move and pivot as required of the lever. The amount of flexing required of member 74 in normal operation is minimized by making the attachments thereto as close as possible to the pivot points of the levers.

As best seen in FIGS. 3, 4 and 9, lever 70 has an angularly upturned portion 70a which engages on the under surface of a semi-cylindrical boss 62d formed on drive lever 62. Lever 72 has a generally C-shaped free end 72a which overlies the boss 62d in a recess 62e formed in lever 62 and engages with boss 62d to pivot lever 62 clockwise under decreasing power element pressure changes as will hereinafter be explained.

Range adjusting cam 78 is provided with a central opening and is mounted on a cylindrical boss 42g formed on base 42. A spring washer 86 frictionally gripping the periphery of an inner concentric boss 42f bears against cam 78 to hold it against axial displacement. A member 88 journaled for rotational movement in mounting bracket 36 has a lug 88a which interfits with cam 78 in an opening 78a formed in the latter. On the outer side of bracket 36 member 88 penetrates and is nonrotatably upset over a U-shaped member 90 to which range adjusting knob 34 is fitted. The portion 88_b_ has a triangular shaped high point 88_c_ which when knob 34 is turned to its counterclockwise extreme limit (when looking in from the left in FIG. 1) engages the end 62_f_ of a hook portion 62_g_ of drive lever 62 to pivot the latter to a clockwise extreme position wherein it manually toggles member 54 to and holds it in a position disengaging contacts 52 and 46. The last mentioned extreme limit is determined when member 90 engages a raised projection 36_a_ struck up from the bracket 36.

Figure 7:
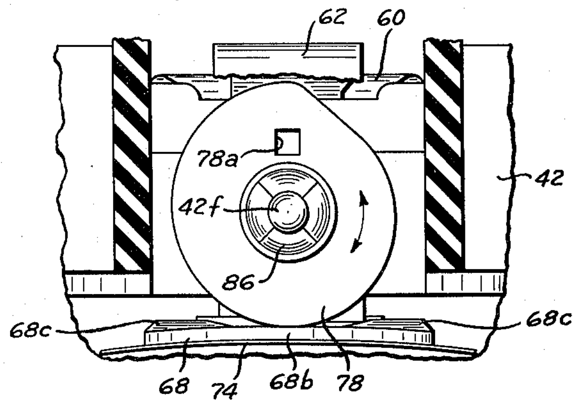
FIG. 7 is a fragmentary view partially in cross section taken along the line 7—7 of FIG. 3.

In one preferred embodiment of cam 78 its peripheral form will be like that depicted in FIG. 7. As viewed in FIG. 7, if cam is rotated clockwise the radial distance between its point of engagement with the end 68_b_ of range lever 68 and its axis of rotation decreases thereby causing the end 68_b_ to move upwardly as member 68 pivots on the ends of legs 66_a_ of thrust plate. Consequently lever 68 pivots clockwise as viewed in FIGS. 3 and 4, thereby lowering its end 68_d_ which in turn causes cut-in and cut-out levers 70 and 72 to pivot counterclockwise about the ends of the differential adjusting screws 80 and 83. As will hereinafter be apparent the higher the position of the end 68_b_ of range lever 68 as established by cam 78, the higher will be the pressures in power element 30 at which contact 52 will be engaged and subsequently disengaged from contact 46.

Let it be assumed that the contacts 52 and 46 are initially open as depicted in FIG. 3, and that cam 78 is given an intermediate adjustment depicted. Now if element 40 is subjected to an increasing temperature, the pressure in chamber 38 will increase and diaphragm 30_d_ will move upwardly. Thrust plate 66 moves upwardly with diaphragm 30_d_ which in turn pivots range lever 68 counterclockwise at its point of engagement with the edge of cam 78. Such movement of lever 68 causes both the cut-in and cut-out levers 70 and 72 to be pivoted clockwise about their pivot points on the ends of differential adjusting screws 80 and 82. As cut-in lever 70 continues to pivot clockwise it ultimately engages the lower side of boss 62_d_ of drive lever 62. Further clockwise pivoting of lever 70 results in counterclockwise pivoting of lever 62 to provide the closing of contact 52 to contact 46 as hereinbefore described. Thus the aforedescribed levers 68, 70, 72 and 62 attain the positions depicted in FIG. 4.

Now assume, as a result of closure of contacts 52 and 46 and operation of refrigerating apparatus controlled by such contacts, that the temperature to which temperature responsive element 40 is subjected decreases. This causes a reduction in vapor or gas pressure in chamber 38 and diaphragm 30_d_ moves downwardly. Bias spring 76 acting on cut-out lever 72 causes the latter and range lever 68 to pivot counterclockwise and clockwise respectively in following the downward movement of diaphragm 30_d_. Ultimately the C-shaped end 72_a_ of cut-out lever 72 engages the boss 62_d_ on its upper side and pivots drive lever 62 clockwise. When lever 62 is pivoted clockwise sufficiently contacts 52 and 46 are toggled opened as hereinbefore described. As will be understood the force exerted by spring 76 must be sufficient to effect operation of the snap action switch mechanism but should not have a spring rate greater than necessary to minimize the loading on diaphragm 30_d_. Spring rates in the range of 2 to 3 lbs. per inch have proved to be satisfactory for spring 76.

It will be apparent that the levers 68 and 70 or 72 provide considerable motion amplification for any upward or downward movement of diaphragm 30_d_. For a given setting of range adjusting cam 78, diaphragm 30_d_, thrust plate 66 and levers 68, 70 and 72 take new positions for each unit change in pressure developed in element 40.

The spacing between the ends 70_a_ and 72_a_ which underlie and overlie the boss 62_d_ of drive lever 62 determines the differential between cut-in and cut-out toggle operation to close and open the contacts 52 and 46. This differential is adjustable in accordance with the adjustment of the screws 80 and 82. Cut-in and cut-out differential adjustments are initially established by subjecting element 40 to a low cut-out temperature, say 20° F. for a given intermediate adjustment of cam 78. When element 40 is statabilized at 20° adjusting screw 82 is adjusted to pivot lever 72 counterclockwise and engage boss 62_d_ of drive lever 62 and is continued until toggle action of the contact operating mechanism occurs and opens contacts 52 and 46. If it is desired that contacts 52 and 46 reclose at a 10° higher temperature, then element 40 will next be subjected and stabilized at such a temperature, e.g., 30° F. and adjusting screw 80 is turned to pivot lever 70 clockwise on end 68_d_ of lever 68 to engage boss 62_d_ and pivot drive lever 62 until the point is reached where the contact operating mechanism is toggled to close contacts 52 and 46. Thereafter for any given positioning of cam 78 the cut-in and cut-out temperatures will always have the same fixed differential.

We claim:

1. In a motion transmitting mechanism, in combination, a thin flexible metal member having a central portion and spaced apart arms integral with and on opposite sides of said central portion, a motion follower member attached to said central portion, a first lever attached at one end to said central portion at a point spaced from said follower member and engaging the latter intermediate the ends of said lever, and second and third levers attached at corresponding ends to the ends of said arms, at least one of said second and third levers bearing intermediate its ends on the free end of said first lever.

2. The combination according to claim 1, wherein said arms of said flexible member substantially encircle said central portion and said second and third levers extend parallel with each other from their points of attachment to said flexible member.

References Cited by the Examiner

UNITED STATES PATENTS

| | | | |
|---|---|---|---|
| 2,181,068 | 11/1939 | Riche | 74—100 |
| 2,600,564 | 6/1952 | Millard | 74—100 |

BROUGHTON G. DURHAM, *Primary Examiner.*